(12) United States Patent
DeRoche

(10) Patent No.: US 10,650,688 B1
(45) Date of Patent: May 12, 2020

(54) AIR TRAFFIC SITUATIONAL AWARENESS USING HF COMMUNICATION

(71) Applicant: Rockwell Collins, Inc., Cedar Rapids, IA (US)

(72) Inventor: Michael J. DeRoche, Melbourne, FL (US)

(73) Assignee: Rockwell Collins, Inc., Cedar Rapids, IA (US)

(*) Notice: Subject to any disclaimer, the term of this patent is extended or adjusted under 35 U.S.C. 154(b) by 184 days.

(21) Appl. No.: 15/217,914

(22) Filed: Jul. 22, 2016

(51) Int. Cl.
*G08G 5/04* (2006.01)

(52) U.S. Cl.
CPC ...................... *G08G 5/04* (2013.01)

(58) Field of Classification Search
None
See application file for complete search history.

(56) References Cited

U.S. PATENT DOCUMENTS

| | | | | | |
|---|---|---|---|---|---|
| 4,274,096 | A * | 6/1981 | Dennison | ............ | G01S 13/9303 342/456 |
| 4,293,857 | A * | 10/1981 | Baldwin | ............. | G01S 13/9303 342/32 |
| 5,570,095 | A * | 10/1996 | Drouilhet, Jr. | ........ | G01S 5/0072 342/357.31 |
| 5,636,123 | A * | 6/1997 | Rich | ..................... | G01S 5/0072 342/29 |
| 5,745,081 | A * | 4/1998 | Brown | ..................... | H01Q 1/28 343/705 |
| 5,790,438 | A * | 8/1998 | Simonnet | ........... | G01R 31/2834 342/165 |
| 6,195,609 | B1 * | 2/2001 | Pilley | ..................... | G01C 23/00 701/120 |
| 6,271,768 | B1 * | 8/2001 | Frazier, Jr. | ........... | G08G 5/0008 340/961 |
| 6,314,366 | B1 * | 11/2001 | Farmakis | .............. | B60R 25/102 340/961 |
| 6,567,395 | B1 * | 5/2003 | Miller | ................ | H04B 7/18502 370/345 |
| 6,917,863 | B2 * | 7/2005 | Matos | .................. | G08G 5/0056 701/16 |
| 7,123,192 | B2 * | 10/2006 | Smith | ....................... | G01S 5/06 342/455 |
| 7,257,469 | B1 * | 8/2007 | Pemble | ............... | G01C 23/005 340/945 |

(Continued)

*Primary Examiner* — Steven Lim
*Assistant Examiner* — Muhammad Adnan
(74) *Attorney, Agent, or Firm* — Donna P. Suchy

(57) ABSTRACT

A system for reporting aircraft situational awareness information associated with a first aircraft can include a global positioning system (GPS) receiver configured to receive positioning signals and determine a position of the first aircraft. The system can also include a traffic collision avoidance system (TCAS) configured to receive collision avoidance information from one or more second aircrafts. The system can also include a processor, coupled to the GPS receiver and the TCAS, configured to generate a situational awareness message using the determined position of the first aircraft and the collision avoidance information received from the one or more second aircrafts. The system can include a high frequency (HF) transceiver coupled to the processor and configured to transmit the generated situational awareness message, through a HF channel, to one or more HF ground stations.

20 Claims, 3 Drawing Sheets

(56) References Cited

U.S. PATENT DOCUMENTS

| | | | | |
|---|---|---|---|---|
| 7,426,387 | B2* | 9/2008 | Wright | G05D 1/0055 340/945 |
| 7,864,096 | B2* | 1/2011 | Stayton | G08G 5/0008 342/29 |
| 7,917,254 | B2* | 3/2011 | Krogh | G08G 5/025 244/158.1 |
| 8,280,563 | B2* | 10/2012 | McGuffin | G08G 5/0013 370/401 |
| 8,280,741 | B2* | 10/2012 | Colin | G08G 5/0013 704/231 |
| 8,498,803 | B2* | 7/2013 | Blomenhofer | G08G 5/0052 701/120 |
| 8,509,140 | B2* | 8/2013 | Kauffman | H04B 7/18504 370/316 |
| 8,604,942 | B2* | 12/2013 | Whitlow | G01C 23/00 340/961 |
| 9,147,349 | B2* | 9/2015 | Maddanimath | G08G 5/0021 |
| 9,275,550 | B1* | 3/2016 | Stefani | G08G 5/0013 |
| 9,282,500 | B1* | 3/2016 | Thommana | H04W 40/02 |
| 9,465,097 | B2* | 10/2016 | Stayton | G01S 13/767 |
| 9,470,528 | B1* | 10/2016 | Wang | G01C 23/00 |
| 9,511,877 | B2* | 12/2016 | Masson | B64D 43/00 |
| 9,607,447 | B2* | 3/2017 | Gremmert | G07C 5/008 |
| 9,807,571 | B1* | 10/2017 | Bauler | H03F 1/3223 |
| 9,824,591 | B1* | 11/2017 | Ryan | G08G 5/0013 |
| 9,941,950 | B2* | 4/2018 | Babich | H04B 7/18504 |
| 10,001,546 | B2* | 6/2018 | Gibson | G01S 5/0054 |
| 10,089,893 | B2* | 10/2018 | Dacre-Wright | G08G 5/0013 |
| 10,139,474 | B2* | 11/2018 | Gurusamy | G01S 7/24 |
| 10,147,328 | B2* | 12/2018 | Mullin | G01S 13/785 |
| 10,173,772 | B2* | 1/2019 | Lee | H04L 63/08 |
| 10,244,389 | B1* | 3/2019 | Earnhardt, Jr. | H04W 12/02 |
| 10,390,581 | B1* | 8/2019 | Henry | G06F 3/012 |
| 2003/0016159 | A1* | 1/2003 | Stayton | G08G 5/0008 342/30 |
| 2003/0137444 | A1* | 7/2003 | Stone | G08G 5/0008 342/30 |
| 2005/0107041 | A1* | 5/2005 | Eder | H04W 88/06 455/77 |
| 2006/0046715 | A1* | 3/2006 | Burgemeister | G08G 5/0013 455/431 |
| 2007/0087750 | A1* | 4/2007 | Uchida | H04W 72/042 455/436 |
| 2007/0132638 | A1* | 6/2007 | Frazier | G01S 13/765 342/455 |
| 2007/0222697 | A1* | 9/2007 | Caimi | H01Q 1/243 343/861 |
| 2008/0186857 | A1* | 8/2008 | Becker | H04B 7/18582 370/235 |
| 2008/0211709 | A1* | 9/2008 | Smith | G01S 5/0027 342/32 |
| 2008/0266166 | A1* | 10/2008 | Schuchman | G07C 5/008 342/37 |
| 2009/0186611 | A1* | 7/2009 | Stiles | H04B 7/18506 455/431 |
| 2010/0023848 | A1* | 1/2010 | Poutas | G08G 5/0095 714/811 |
| 2011/0176464 | A1* | 7/2011 | Warner | H04B 1/713 370/311 |
| 2013/0332078 | A1* | 12/2013 | Shin | G06T 17/05 701/533 |
| 2014/0350780 | A1* | 11/2014 | Chai | B64D 45/00 701/32.8 |
| 2015/0081138 | A1* | 3/2015 | Lacko | B64D 45/00 701/3 |
| 2015/0327278 | A1* | 11/2015 | Linden | H04L 1/1621 370/252 |
| 2016/0127242 | A1* | 5/2016 | Bernheim | H04L 47/11 370/244 |
| 2016/0275801 | A1* | 9/2016 | Kopardekar | G08G 5/0043 |
| 2016/0292932 | A1* | 10/2016 | Gremmert | G07C 5/008 |
| 2017/0001699 | A1* | 1/2017 | Macikunas | G08G 3/00 |
| 2017/0011634 | A1* | 1/2017 | Ringlen | G08G 5/0013 |
| 2017/0039858 | A1* | 2/2017 | Wang | G10L 25/51 |
| 2017/0237179 | A1* | 8/2017 | Park | H01Q 21/065 343/893 |
| 2017/0324508 | A1* | 11/2017 | Vanninen | H04L 27/362 |

* cited by examiner

AIR TRAFFIC SITUATIONAL AWARENESS USING HF COMMUNICATION

BACKGROUND

Air traffic control ground stations continuously track air traffic in real time. As aircrafts navigate in the air or on airport runways, air traffic control ground stations continuously collect data indicative of the locations of such aircrafts. Air traffic control ground stations also exchange air traffic data between them to allow each ground station to generate a broad (e.g., worldwide or over a wide geographic region) and live view or map of instantaneous air traffic. Air traffic control ground stations can receive air traffic data from airplanes, other air traffic control ground stations, online air traffic services, or other sources. Air traffic data can include, for example, aircraft identification, aircraft location information, aircraft speed and direction information, takeoff time, expected landing time, or a combination thereof. Using collected air traffic data, air traffic control ground station can direct aircrafts on the ground and through respective controlled airspace. Air traffic control ground stations can also provide advisory services to aircrafts in respective non-controlled airspace.

Air traffic surveillance systems can employ Automatic Dependent Surveillance-Broadcast (ADS-B) data, multilateration (MLAT) data, radar data, or a combination thereof. A MLAT system employs a plurality of MLAT ground stations placed at different locations. The MLAT system determines a location of an aircraft based on time delays associated with replicas (or copies) of an aircraft signal received by the MLAT ground stations. The ADS-B is a surveillance technology where aircrafts take an active role in determining their positions via satellite navigation and periodically broadcast their position information to ground stations. Ground stations use the received ADS-B data to track the aircrafts in real time. Radars can transmit signals and receive respective echoes as the transmitted signals bounce of aircrafts within radar coverage range. Radar systems can determine aircraft location based on the angle of arrival of the received echo signal and the total travel time for the transmitted signal.

Geographic regions such as oceans, North and South poles and/or under populated regions (e.g., the big Sahara in Africa) can include very few or no air traffic control ground stations. Aircrafts flying over such regions may not have access to air traffic control ground stations. As such, air traffic control ground stations are not able to track aircrafts flying over such regions in real time. Also, aircrafts flying over such regions are unable to receive air traffic information from air traffic control ground stations. As such, aircrafts may have to rely on other sources of air traffic information (such as on board anti-collision systems) to avoid air collision. For example, direct communications between aircrafts in proximity to each other may allow each aircraft to determine the locations of other aircrafts in its surrounding.

The failure to track or monitor air traffic over certain geographic regions may pose serious challenges and risks to air traffic operations. For example, in the case of an air traffic accident over such regions, air traffic control and rescue missions may not have sufficient air traffic information to precisely determine the location of the accident. Also, in the case where the anti-collision system of an aircraft may fail while the aircraft is flying over such geographic regions, the aircraft would not have access to air traffic information for a while. In such case, the aircraft would be at risk of collision with other aircrafts.

SUMMARY

In one aspect, the inventive concepts disclosed herein are directed to a system for reporting aircraft situational awareness information associated with an aircraft. The system includes a global positioning system (GPS) receiver configured to receive positioning signals and determine a position of the aircraft. The system also comprises a traffic collision avoidance system (TCAS) configured to receive collision avoidance information from one or more other aircrafts. The system includes a processor, coupled to the GPS receiver and the TCAS, configured to generate a situational awareness message using the determined position of the first aircraft and the collision avoidance information received from the one or more second aircrafts. The system includes a high frequency (HF) transceiver coupled to the processor and configured to transmit the generated situational awareness message, through a HF channel, to one or more HF ground stations.

The HF transceiver can receive periodic signals from a HF ground station of the one or more HF ground stations. The periodic signals allow the HF transceiver to synchronize with time slots defined by the HF ground station. The HF transceiver can send, responsive to receipt of one or more of the periodic signals, a request to the HF ground station for a time slot to transmit the generated situational awareness message. Responsive to the request, the HF transceiver can receive, from the ground station, an indication of a time slot assigned to the first aircraft. The HF transceiver can transmit the generated situational awareness message during the assigned time slot. The request sent by the HF transceiver to the HF ground station can include a request for a transmission frequency for transmitting the generated situational awareness message.

The system can further include a transponder to broadcast information indicative of the position of the first aircraft to one or more aircrafts in proximity to the first aircraft. The HF transceiver can receive one or more situational awareness messages from one or more other aircrafts. For each of these other aircrafts, a respective situational awareness message can be received via a HF datalink and can include at least an indication of the position of that aircraft and information indicative of positions of other aircrafts. The processor can generate a positioning map representative of positions of a plurality of aircrafts based on the one or more situational awareness messages received from the one or more of the other aircrafts and the collision avoidance information received by the TCAS. The HF transceiver can also be configured to receive information indicative of positions of a plurality of aircrafts from the HF ground station.

The HF transceiver can be configured to receive or transmit high bandwidth HF data. For instance, the HF transceiver can have an operational bandwidth including a frequency band extending between 2 and 30 MHz. The HF channel can be configured to support a transmission or reception rate of at least 1800 baud.

In one aspect, the inventive concepts disclosed herein are directed to a method for a reporting aircraft situational awareness information for an aircraft. The method comprises a GPS receiver receiving positioning signals and determining a position of the first aircraft based on the received positioning signals. The method comprises a TCAS receiving collision avoidance information from one or more second aircrafts, and a processor, coupled to the GPS receiver and the TCAS, generating a situational awareness message using the determined position of the first aircraft and the collision avoidance information received from the one or more second aircrafts. The method also comprises a HF transceiver, coupled to the processor, transmitting the generated situational awareness message, through a HF channel, to one or more HF ground stations.

The method can include the HF transceiver receiving periodic signals from a HF ground station of the one or more HF ground stations. The periodic signals can allow the HF transceiver to synchronize with time slots defined by the HF ground station. The method can further include the HF transceiver sending, responsive to receipt of one or more of the periodic signals, a request to the HF ground station for a time slot to transmit the generated situational awareness message. Responsive to the request, the HF transceiver can receive, from the ground station, an indication of a time slot assigned to the aircraft. The HF transceiver can transmit the generated situational awareness message during the assigned time slot. The request sent by the HF transceiver to the HF ground station can include a request for a transmission frequency for transmitting the generated situational awareness message.

In some embodiments, the method includes a transponder broadcasting information indicative of the position of the aircraft to one or more aircrafts in proximity to the first aircraft. The method can also include the HF transceiver receiving one or more situational awareness messages from one or more other aircrafts. For each of the other aircrafts, a respective situational awareness message can be received via a HF datalink and can include at least an indication of the position of that aircraft and information indicative of positions of other aircrafts. The method can further comprise the processor generating a positioning map representative of positions of a plurality of aircrafts based on the one or more situational awareness messages received from the one or more of the other aircrafts and the collision avoidance information received by the TCAS. In some embodiments, the method can comprise the HF transceiver receiving information indicative of positions of a plurality of aircrafts from the HF ground station.

The HF transceiver can receive or transmit high bandwidth HF data. For instance, the HF transceiver can have an operational bandwidth including a frequency band extending between 2 and 30 MHz. The HF channel can support a transmission or reception rate of at least 1800 baud.

In one aspect, the inventive concepts disclosed herein are directed to a system for monitoring aircraft positioning. The system comprises a GPS receiver of an aircraft configured to receive positioning signals and determine a position of the aircraft. The system also comprises a TCAS of the aircraft configured to receive collision avoidance information from one or more other aircrafts, and a processor, coupled to the GPS receiver and the TCAS, configured to generate a situational awareness message using the determined position of the first aircraft and the collision avoidance information from the one or more other aircrafts. The system also comprises a high frequency (HF) transceiver coupled to the processor and configured to transmit the generated situational awareness message through a HF channel. The system also comprises a network of communicatively coupled HF ground stations configured to receive the generated message via at least one of the HF ground stations, and transmit information associated with the generated situational awareness message to a server for generating a positioning map indicative of positions of a plurality of aircrafts. The HF ground stations can have an operational bandwidth including a frequency band extending between 2 and 30 MHz.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

Figure 1:
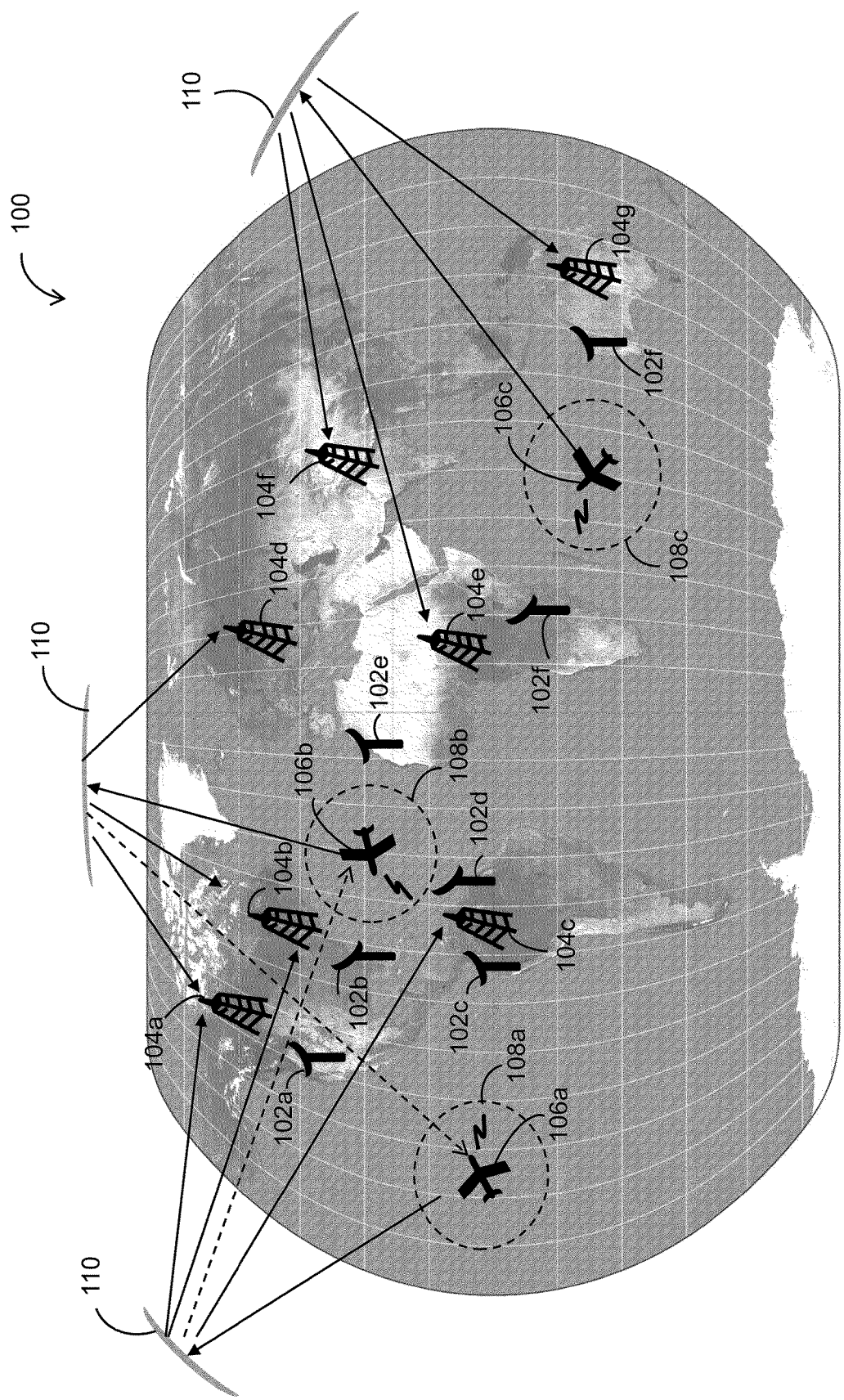
FIG. 1 shows a diagram illustrating one embodiment of an air traffic surveillance environment, in accordance with inventive concepts of the current disclosure.

The details of various embodiments of the methods and systems are set forth in the accompanying drawings and the description below.

DETAILED DESCRIPTION

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the diagrams provided in this disclosure, but should be construed in accordance with the language in the claims.

Referring to FIG. 1, a diagram illustrating an air traffic surveillance environment 100 in accordance with inventive concepts disclosed herein is shown. The air traffic surveillance environment 100 includes a plurality of air traffic control ground stations 102a-102f, referred to hereinafter either individually or collectively as air traffic control ground station(s) 102, a plurality of HF ground stations 104a-104g, referred to hereinafter either individually or collectively as HF ground station(s) 104, and a plurality of aircrafts 106a-106c, referred to hereinafter either individually or collectively as aircraft(s) 106. The air traffic surveillance environment 100 allows for monitoring and tracking air traffic and aircraft locations throughout air flights.

Each aircraft 106 can be equipped with a navigation system such as a global positioning system (GPS). The navigation system of each aircraft 106 can be configured to continuously (or periodically) receive positioning signals from one or more satellites (not shown in FIG. 1), and determine a location (such as position coordinates) of the respective aircraft. Each aircraft 106 can include a respective transponder for periodically broadcasting automatic dependent surveillance-broadcast (ADS-B) data to air traffic control ground stations 102 and other aircrafts 106 in its vicinity. The ADS-B data includes information indicative of the position of the aircraft determined using the satellite positioning signals. The ADS-B data can further include information indicative of the aircraft's identification (ID), air speed, direction, destination, takeoff location, takeoff time, expected time of arrival, or a combination thereof. The ADS-B data allows the air traffic control ground stations 102 to continuously track the location of the aircraft and generate, or update, aircraft (or flight) situational awareness information indicative of locations of the plurality of aircrafts 106. Also, the exchange of ADS-B data (or positioning data in general) between aircrafts that are flying in proximity to each other can help the aircrafts 160 avoid collisions.

An aircraft 106 may not be able to communicate with air traffic control ground stations 102 throughout the entirety of a given flight. The broadcasting range of each aircraft 106 is limited based on the frequency and power of the respective transponder. Aircraft transponders operate at the L-Band (e.g., 1 to 2 GHz frequency range). For example, many aircraft transponders operate at about 1090 MHz. L-band waves can penetrate through clouds, fog, rain, storms, and vegetation allowing communications between the aircrafts 106 and the air traffic control ground stations 102 and communications between separate aircrafts 106 in all weather conditions. However, the aircraft transponder power limits the transmission energy and therefore limits the propagation range of the broadcast ADS-B data. Such propagation range can be, for example, less than or equal to 200 nautical miles (nmi). The aircrafts 106a, 106b, and 106c are associated with ADS-B propagation ranges (or broadcast coverage ranges) 108a, 108b, and 108c, respectively. As illustrated in FIG. 1, none of the air traffic control ground stations 11a-11f are within the broadcast coverage range of any of the aircrafts 106a, 106b and 106c. In such scenario, the aircrafts 106a, 106b and 106c are not able to exchange ADS-B data with any of the air traffic control ground stations 102.

Air traffic control ground stations 102 can be associated with airports or with air traffic service providers. Air traffic control ground stations 102 can be connected to one another or to air traffic control computer servers via one or more communications networks, such as the Internet. Air traffic control servers can use data received from multiple air traffic control ground stations 102 to reconstruct broad maps (or representations) of the locations of a plurality of aircrafts, for example, worldwide or across a wide geographic region. However, the geographic distribution of air traffic control ground stations 102 does not span all possible segments of aircraft flight routes. For example, in the scenario depicted in FIG. 1, no air traffic control ground station 102 is within the broadcasting range of any of the aircrafts 106a, 106b and 106c. In such a scenario, the aircrafts 106a-106c are not communicating with any of the air traffic control ground stations 102, and ground air traffic control/monitoring systems have no access to ADS-B data broadcast by the aircrafts 106a-106c. As a result, air traffic control/monitoring systems may temporarily lose track of aircrafts 106a-106c unless other communication technology is used.

Satellite communications can be a possible communications technology to supplement existing aircraft situational awareness technologies in order to allow reporting aircraft ADS-B data to air traffic control ground stations 102, especially while the aircrafts 15 are not within broadcasting range with any air traffic control ground stations 102. However, using satellite communications is expensive and may significantly increase aviation cost. For instance, the use of satellite communication may involve significant modifications to aircrafts 106 and air traffic control ground stations 102 to support satellite communications. Furthermore, service fees for using satellites are costly.

According to example embodiments of the current disclosure, aircrafts 106 can be equipped with high frequency (HF) transceivers configured to transmit and/or receive HF modulated signals. In addition, HF ground stations 104 can be configured to communicate with the aircrafts 106 that are equipped with high frequency (HF) transceivers, for example, to exchange aircraft positioning data. In HF communication, HF signals transmitted by aircrafts 106 can bounce off ionosphere layers 110 to be received by HF ground stations 104 located far away from the transmitting aircraft. For example, HF signals transmitted by aircraft 150a can be reflected from ionosphere layers 110 and received by HF ground stations 104a, 104b, and 104c. The same signals can be received by other aircrafts, such as aircraft 106b, that are equipped with HF transceivers. Also, signals transmitted by aircraft 106b can be reflected from the ionosphere layers 110 and then received by the HF ground stations 104a, 104b and 104d. The HF signals transmitted by aircraft 106b can also be received by the aircraft 106a, for example, after bouncing off ionosphere layers 110. It should be appreciated that HF signals transmitted by an aircraft 106 can bounce off ionosphere layers and off the ground one or more times before being received by a HF ground station 104 or an aircraft 106 equipped with HF transceiver(s). HF signals transmitted by an aircraft 106 can be received by another aircraft 106 or an HF ground station 120 that is several hundreds or even thousands of miles away.

In accordance with inventive concepts disclosed herein, HF communication can be used to allow air traffic control/monitoring systems to track and monitor air traffic even over regions with very few or no air traffic control ground stations 102. Aircrafts 106 can be configured to transmit air traffic data via HF channels in addition to broadcasting ADS-B data. HF ground stations 104 can be communicatively interconnected via Ethernet or other communication links (or communications networks) to form a network of HF ground stations. Air traffic control/monitoring systems can be communicatively coupled to the network of HF ground stations 104 as well as air traffic control ground stations 102 to receive real-time air traffic data broadcast or transmitted by various aircrafts 106. Using ADS-B data obtained from air traffic control ground stations 102 and air traffic control data obtained via HF ground stations 104, control/monitoring systems can generate broad real-time maps or views of aircraft locations. In some embodiments, the combination of air traffic control ground stations 102 and HF ground stations 104 can allow for tracking and monitoring air traffic, for example, throughout the globe or over a wide geographic region.

Figure 2:
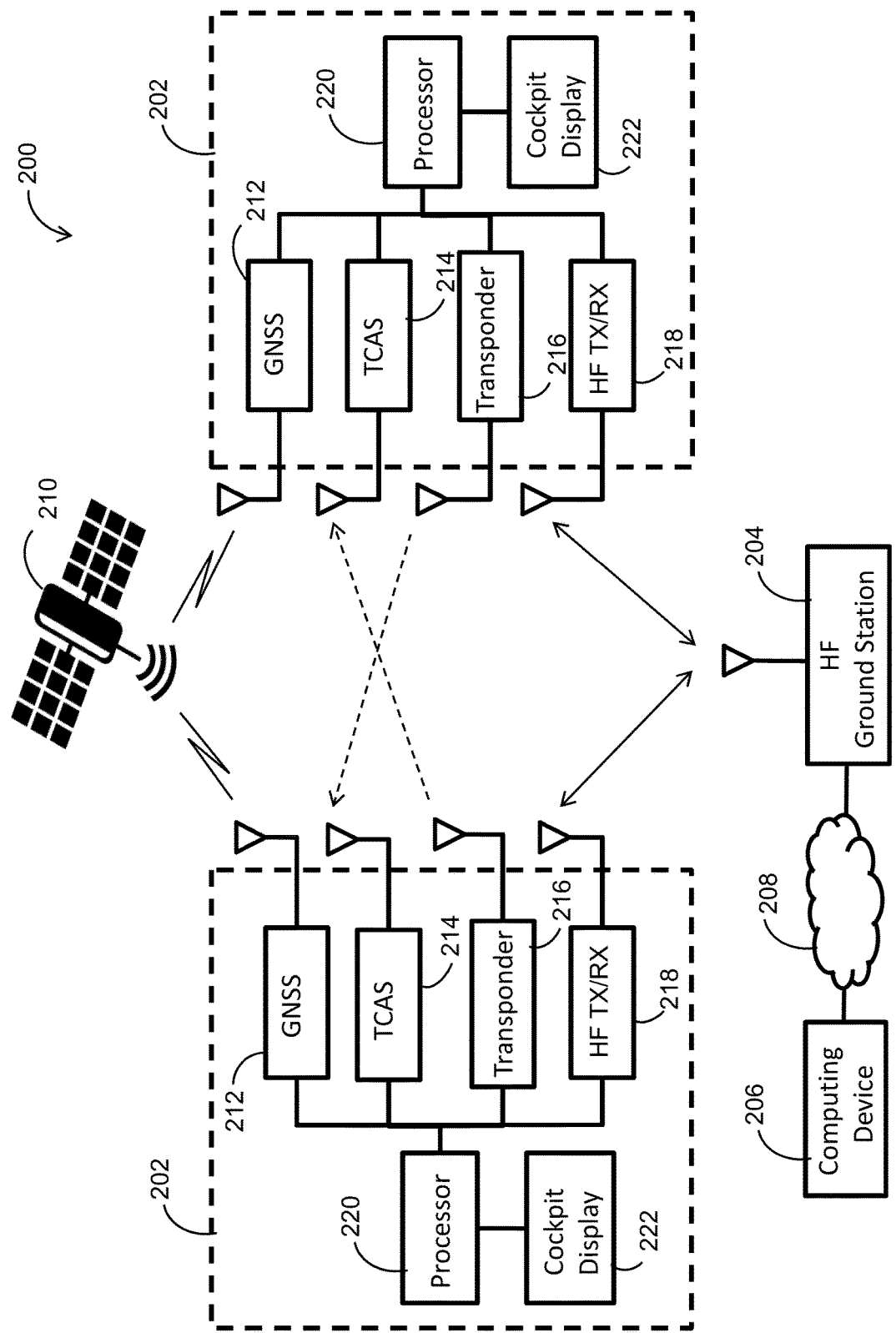
FIG. 2 shows a block diagram of one embodiment of an improved air traffic situational awareness system, according to inventive concepts of the current disclosure.

Referring to FIG. 2, a block diagram of one embodiment of an improved air traffic situational awareness system 200 according to inventive concepts disclosed herein is shown. The air traffic situational awareness system 200 can include a plurality of aircraft situational awareness systems 202, each of which associated with a respective aircraft, one or more HF ground stations 204, and one or more computing devices 206. The one or more computing devices 206 can be coupled to the one or more HF ground stations via a communications network 208. Each aircraft situational awareness system 202 can receive positioning signals from a satellite 210. Each aircraft situational awareness system 202 can include a global navigation satellite system (GNSS) receiver 212, a traffic collision avoidance system (TCAS) 214, a transponder 216, and a HF transceiver 218. Each aircraft situational awareness system 210 can further include a processor 220 and a cockpit display device 222.

The GNSS receiver 212 can be, for example, a GPS receiver or a GLobal NAvigation SyStem (GLONASS) receiver. For each aircraft, the respective GNSS receiver 212 can be configured to periodically receive positioning signals from a plurality of satellites 210, and determine the instantaneous position of the aircraft based on the received positioning signals. For instance, the GNSS receiver 212 can determine the three-dimensional coordinates of the aircraft, at a given point of time, based on the positioning signals received from the satellites 210. The GNSS receiver 212 can be coupled to a respective antenna for receiving positioning signals from satellites 210. The GNSS receiver 212 can include processing circuitry for processing positioning signals and determining aircraft position based on the positioning signals. The GNSS receiver 212 can provide data indicative of the determined aircraft position to the TCAS 214 and/or to the processor 220.

The transponder 216 can be coupled to an antenna and can be configured to periodically broadcast data indicative of the position of the respective aircraft, such as ADS-B data. For example, the transponder 216 can be configured to broadcast such data at a center frequency equal to 1090 MHz. The transponder 216 can be communicatively coupled to the GNSS receiver 212 (either directly or via the processor 220) to periodically receive data indicative of the position of the respective aircraft. The data broadcast by the transponder 216 of a given aircraft can include, for example, an identification of the aircraft, aircraft coordinates, aircraft air speed, aircraft takeoff location, aircraft destination, aircraft expected arrival time, or a combination thereof. The information broadcast by the transponder 216 can be received by other aircrafts and/or by air traffic control ground stations (not shown in FIG. 2) within the broadcasting range of the transponder 216. For instance, depending on the transmit power of the transponder 216, the respective maximum broadcasting range can be about 200 nmi (nautical miles).

The TCAS 214 for each aircraft can receive collision avoidance data broadcast by other aircrafts within a broadcasting range. The collision avoidance data can include ADS-B data or other data broadcast by transponders 216 of other aircrafts and indicative of the positions of the broadcasting aircrafts. The TCAS 214 can be coupled to an antenna for receiving the collision avoidance data, for example, at a center frequency equal to 1030 MHz. The TCAS 214 can also be communicatively coupled to the transponder 216 and/or the GNSS receiver 212 (either directly or via the processor 220). The TCAS 214 allows the respective aircraft to continuously (or periodically) determine the location(s) of nearby aircrafts to avoid collision with other aircrafts. In some implementations, the TCAS 214 (or another receiver of the aircraft) can receive data transmitted by one or more air traffic control ground stations (not shown in FIG. 2) and indicative of the locations of one or more other aircrafts. In some example embodiments, the TCAS 214 can be (or can include) a surveillance processor configured to execute TCAS functions, traffic surveillance system (TSS) functions, integrated surveillance system (ISS) functions, or other surveillance functions known in the art.

The aircraft situational awareness system 202 of a given aircraft can include a HF transceiver 218. The HF transceiver 218 can be configured to transmit situational awareness data to one or more HF ground stations 204. In some embodiments, the situational awareness data can include data indicative of the position of the respective aircraft determined by the GNSS receiver 212. The situational awareness data can also include collision avoidance data received by the TCAS and indicative of positions of one or more other aircrafts. As such, the HF transceiver 218 can be communicatively coupled to the GNSS receiver 212, the TCAS 214, the processor 220, or a combination thereof. The HF transceiver 218 can also be configured to receive data from one or more HF ground stations 204 indicative of the position(s) of one or more other aircrafts.

The HF transceiver 218 can have an operational bandwidth extending, for example, between 1.5 MHz and 30 MHz, between 2 MHz and 30 MHz, between 3 MHz and 30 MHz. The HF transceiver 218 can be configured to support HF channels with standard data signaling rates up to and including 120,000 bits per second (bps). The HF transceiver 218 can be configured to support HF channels with transmission or reception rate of at least 1800 baud. Supporting high speed HF data links (e.g., with high signaling rates, high transmission or reception rates, or high bandwidth, for example, compared to typical HF systems) allows transmission or reception of relatively large HF data messages. While the maximum size of data packets (or data messages) transmitted over typical HF data links may be limited by the bandwidth of such links, using high speed (or high bandwidth) HF data links allows the HF transceiver 218 of an aircraft to transmit both aircraft position data determined by the respective GNSS receiver 212 and collision avoidance data received by the respective TCAS 214 (as situational awareness data) in a single message (or single data segment/packet) to HF ground stations 204 and/or other HF transceivers of other aircrafts. Furthermore, the high speed HF data links (or high speed HF channels) allow the HF transceiver 218 to receive information in indicative of the positions of a plurality of aircrafts in a single message from the HF ground station(s) 204. In other words, supporting high speed HF links allows for efficient and fast transfer of data between HF transceivers 218 of separate aircrafts or between HF transceivers 218 and HF ground stations 204. In some embodiments, the HF transceiver 218 can be configured in accordance with the standard MIL-STD-188-110C, Department of Defense Interface Standard, Interoperability and Performance Standards for Data Modems, Sep. 23, 2011.

The HF transceiver 218 of a given aircraft can be configured to receive situational awareness data transmitted by other aircrafts. Given the broad broadcasting range of HF communications, the HF transceiver 218 can receive situational awareness data from aircrafts that are far away (e.g., beyond the broadcasting range of aircraft transponders 216). As such, an aircraft equipped with an HF transceiver 218 can receive situational awareness data associated with a larger number of aircrafts over a larger geographic region compared to collision avoidance data received by the TCAS 214. The HF transceiver 218 can also receive data from one or more HF ground stations 220 indicative of the positions of a plurality of aircrafts. Data received from HF ground stations 204 can include a map (or a representation) of the positions of the plurality of aircrafts.

The aircraft situational awareness system 202 can include a processor 220. The processor can be communicatively coupled to the GNSS receiver 212, the TCAS 214, the transponder 216, the HF transceiver 218, and/or the cockpit display device 222. In some embodiments, the processor 220 can be part of the TCAS 214. The processor 220 can receive aircraft position data from the GNSS receiver 212 and/and collision avoidance data from the TCAS 214, and generate a situational awareness message including the received. The processor 220 can provide the situational awareness message to the HF transceiver for transmitting to the HF ground stations 204 and/or other HF transceivers 218 of other aircrafts. The processor 220 can also be configured to manage (e.g., synchronize) the operations of the TCAS 214, the transponder 216, and/or the HF transceiver 218.

The processor 220 can be configured to generate a map (or a representation) of positions of other aircrafts, and provide the generated map (or representation) to the cockpit display device 222 for display. The processor 220 can generate the map (or the representation) based on aircraft position data from the GNSS receiver 212, collision avoidance data from the TCAS 214, data received from air traffic control ground stations, data obtained from the HF transceiver 218, or a combination thereof. The cockpit display device 222 can be configured to display the map or representation.

The air traffic situational awareness system 200 can include one or more HF ground stations 204. The HF ground station(s) 204 can be configured to receive situational awareness data transmitted by HF transceivers 218 of aircrafts. The HF ground station(s) 204 can also transmit data indicative of the positions of a plurality of aircrafts over HF channels. In some embodiments, the air traffic situational awareness system 200 can include a plurality of HF ground stations 204 communicatively coupled to each other via Ethernet or other communications means (e.g., via the Internet or other communications networks) to form a network of HF ground stations, such as the HF ground stations network by Aeronautical Radio, Incorporated (ARINC).

According to example embodiments of this disclosure, the ground station(s) can be configured to support time division multiple access (TDMA). For instance, each HF ground station 204 can be configured to broadcast (e.g., via periodic signaling) available time slots for use by HF transceivers 218 to transmit situational awareness data. Upon receiving the time slot signaling from the HF ground station 204, a HF transceiver 218 associated with a respective aircraft can send a request for a specific time slot among the available time slots. In response to receiving such request, the HF ground station 204 can assign the requested time slot to the requesting aircraft and send an acknowledgement message (indicating assignment of the requested time slot) to the requesting aircraft. The HF transceiver 218 of the requesting aircraft can then transmit its situational awareness data during the assigned time slots. In some embodiments, the HF ground stations 204 in a network can share the same set of time slots. In such embodiments, when a time slot is assigned to a given aircraft, all HF ground stations 204 can synchronize their HF receivers to simultaneously receive situational awareness data from that aircraft during the assigned time slot. In some other embodiments, each HF ground station 204 may be configured to manage a separate set of time slots than time slots managed by other ground stations 204.

The ground stations 204 can be configured to support frequency division multiple access (FDMA). Specifically, the ground stations can broadcast indications of multiple frequency sub-bands (or respective center frequencies) available for use by aircrafts to transmit respective situational awareness data. A HF transceiver 218 associated with a respective aircraft can transmit a request for a given frequency and, in response, a ground station 204 can assign the requested frequency to the requesting aircraft and send an acknowledgement back to the HF transceiver 218 of that aircraft. The HF transceiver 218 can then use the assigned frequency (or frequency sub-band) to transmit its situational awareness data. In some embodiments, the ground stations can support a combination of TDMA and FDMA (e.g., a HF transceiver 218 can request a specific time slot and a specific frequency). In some other embodiments, the HF ground stations 204 support code division multiple access (CDMA) where different codes can be assigned to different aircrafts for coding respective situational awareness data.

The HF ground stations 204 can be communicatively coupled to a computing device 206 via one or more communications networks 208, such as the Internet, area networks, metropolitan area networks, local area networks, or a combination thereof. The computing device 206 can be, for example, a server associated with an air traffic control ground station (such as air traffic control ground station 102 discussed above with regard to FIG. 1), the federal aviation administration (FAA), an air traffic surveillance system (such as a website), or the like. The computing device 206 can receive situational awareness data from a plurality of aircrafts. The computing device 206 can use the received data to produce a situational awareness picture (or map). The computing device 206 can overlay the situational awareness picture (or map) with other surveillance data, such as ADS-B data. The computing device can provide the situational awareness map for display on a display device. The computing device 206 can also cause the HF ground stations 204 to broadcast (or transmit to a plurality of aircrafts) the generated situational awareness map. An aircraft receiving data representing the situational awareness map from one or more HF ground stations 204 (or air traffic control ground stations) could filter the received data based on the aircraft position. For example, the aircraft may only care about other aircrafts within 500 miles.

Figure 3:
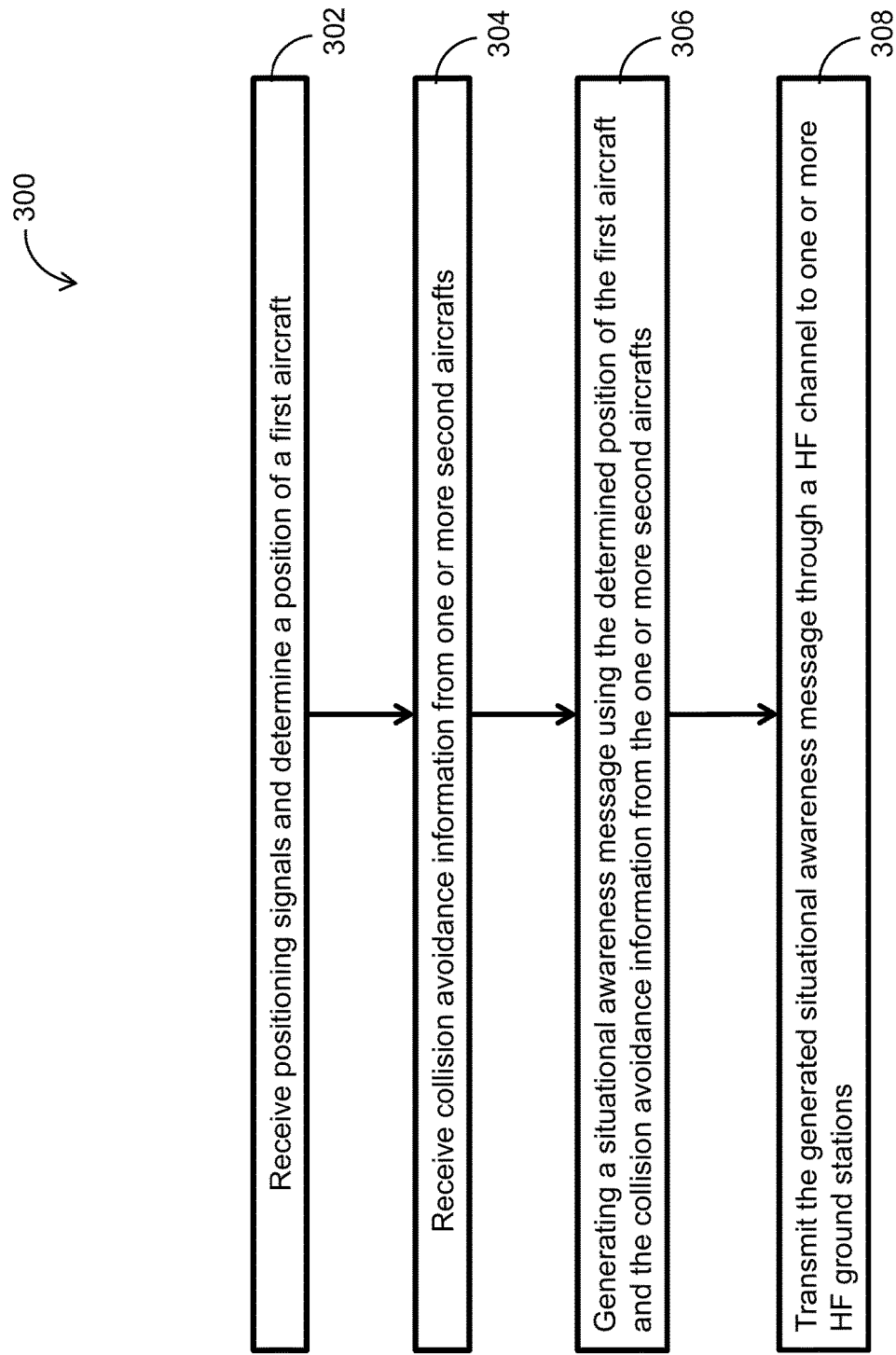
FIG. 3, shows a flowchart illustrating one embodiment of a method for reporting aircraft situational awareness information in accordance with inventive concepts of this disclosure.

Referring to FIG. 3, a flow chart illustrating one embodiment of a method 300 for reporting aircraft situational awareness information in accordance with inventive concepts disclosed herein is shown. The method 300 can include a GNSS receiver of a first aircraft receiving positioning signals and determining a position of the first aircraft (step 302). The method 300 can include a traffic collision avoidance system (TCAS) receiving collision avoidance information from one or more second aircrafts (step 304). The method 300 can also include a processor coupled to the GPS receiver and the TCAS generating a situational awareness message using the determined position of the first aircraft and the collision avoidance information from the one or more second aircrafts (step 306). The method 300 can also include a HF transceiver transmitting the generated situational awareness message through a HF channel to one or more HF ground stations (step 308).

Referring to FIGS. 2 and 3, the method 300 can include a GNSS receiver 212 of a first aircraft receiving positioning signals and determining a position of the first aircraft (step 302). The GNSS receiver 212 can receive positioning signals from a plurality of satellites and use the positioning signals to determine, for example, the longitude and the altitude of the aircraft. The GNSS receiver 212 can be configured to periodically receive the positioning signals and determine the coordinates of the first aircraft.

The method 300 can include a TCAS receiving collision avoidance information from one or more second aircrafts (step 304). The collision avoidance data can include ADS-B data or other data broadcast by other aircrafts and indicative of the positions of the broadcasting aircrafts. The collision avoidance data received from another aircraft can include an identification that aircraft, its position, its air speed, its direction, its destination, its estimated arrival time, its take-off location, or any combination thereof. The TCAS 214 can be configured to receive the collision avoidance data, for example, at a center frequency equal to 1030 MHz, for instance. The received collision avoidance data allows the receiving aircraft to continuously (or periodically) determine the location(s) of nearby aircrafts to help avoid collision. In some implementations, the TCAS 214 (or another receiver of the aircraft) can further receive data transmitted by one or more air traffic control ground stations indicative of the locations of one or more other aircrafts.

The method 300 can also include the processor 220 generating a situational awareness message using the determined position of the first aircraft and the collision avoidance information from the one or more second aircrafts (step 306). The processor 220 can periodically obtain positioning data from the GNSS receiver 212 and collision avoidance data from the TCAS 214, and use both data to generate a situational awareness message. As such, the situational awareness message can include information indicative of the first aircraft position as well as information indicative of positions of other aircrafts in the vicinity of (or within a broadcasting range from) the first aircraft. In some embodiments, the processor 220 generates two separate situational awareness messages associated with the first aircraft position data and the collision avoidance data, respectively. The processor 220 can provide the generated situational awareness message(s) to the HF transceiver 218 for broadcasting or for transmitting to one or more HF ground stations 204.

The method 300 can also include the HF transceiver 218 of the first aircraft transmitting the generated situational awareness message through a HF channel to one or more HF ground stations 204 (step 308). Given the propagation characteristics of HF signals (as discussed with regard to FIG. 1), the transmitted situational awareness message can be received by HF ground stations 204 that are relatively far away (e.g., beyond the broadcasting range of the first aircraft's transponder 216) from the first aircraft. The transmitted situational awareness message can also be received by other aircrafts equipped with HF transceivers 218. The HF transceiver 218 of the first aircraft can be configured to receive or transmit high bandwidth HF data. For instance, the HF transceiver can have an operational bandwidth including a frequency band extending between 2 and 30 MHz. The HF channel can be configured to support a transmission or reception rate of at least 1800 baud, for example.

The method 300 can further include the HF transceiver 218 of the first aircraft receiving periodic signals from a HF ground station 204 including information indicative of available time slots for use to transmit situational awareness data. In response, the HF transceiver 218 can send a request to the HF ground station 204 for a time slot of the available time slots to transmit the generated situational awareness message. Upon receiving the request, the HF ground station 204 can assign a given time slot to the first aircraft and send an acknowledgement message indicative of such assignment to the first aircraft. The HF transceiver 218 can receive, from the ground station 204, the acknowledgement message indicative of the assigned time slot, and can transmit the generated situational awareness message during the assigned time slot.

In some embodiments, the HF ground stations 204 can alternatively (or additionally) broadcast transmission frequency or (frequency sub-bands) for use by aircrafts to transmit situational awareness data. The HF transceiver 218 of the first aircraft can send a request for a transmission frequency. In some embodiments, the request for a time slot can further include a request for a transmission frequency. The HF ground station 204 can respond with an indication of a given transmission frequency which the HF transceiver 218 of the first aircraft can use for transmitting its situational awareness message.

The method 300 can further include the transponder 216 of the first aircraft broadcasting information indicative of the position of the first aircraft to one or more aircrafts in proximity to the first aircraft. The broadcast information can include ADS-B data. The broadcast information can be received by air traffic control ground stations with a broadcasting range of the transponder 216. The method 300 can also include the HF transceiver 218 receiving one or more situational awareness messages from one or more other aircrafts. For each of the other aircrafts, a respective situational awareness message can be received via a HF datalink and can include at least an indication of the position of that other aircraft and information indicative of positions of additional aircrafts in the vicinity of the other aircraft. The method 300 can further include the processor 220 of the first aircraft generating a positioning map representative of positions of a plurality of aircrafts based on the one or more situational awareness messages received from the other aircrafts and the collision avoidance information received by the TCAS. In some embodiments, the method 300 includes the HF transceiver 218 of the first aircraft receiving information indicative of positions of a plurality of aircrafts from the HF ground station.

The construction and arrangement of the systems and methods are described herein as illustrative examples and are not to be construed interpreted as limiting. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

What is claimed is:

1. A system for reporting aircraft situational awareness information, the system comprising:
 a global positioning system (GPS) receiver of a first aircraft, the GPS receiver configured to receive positioning signals and determine a position of the first aircraft;
 a traffic collision avoidance system (TCAS) of the first aircraft configured to receive collision avoidance information from one or more second aircrafts;
 a processor of the first aircraft coupled to the GPS receiver and the TCAS, and configured to generate a situational awareness message using the determined position of the first aircraft and the collision avoidance information from the one or more second aircrafts; and
 a high frequency (HF) transceiver of the first aircraft coupled to the processor and configured to transmit, while no air traffic control ground station is within automatic dependent surveillance-broadcast (ADS-B) broadcast coverage range from the first aircraft and during a time slot assigned by a HF-capable air traffic control ground station to the HF transceiver according to a time division multiplexing scheme, the generated situational awareness message in a single data packet through a HF channel to one or more HF-capable air traffic control ground stations, the HF transceiver having an operational bandwidth including a frequency band extending from 3 MHz to 30 MHz, and HF signals representing the single data packet reflecting off one or more ionosphere layers before reaching the one or more HF ground stations, the generated situational awareness message transmitted in the single data packet allowing a ground air traffic control system including the one or more HF-capable air traffic control stations to track the first aircraft while no air traffic control ground station is within ADS-B broadcast coverage range from the first aircraft.

2. The system of claim 1, wherein the HF transceiver is configured to:

receive periodic signals from the HF-capable air traffic control ground station, the periodic signals for synchronizing with time slots defined by the HF-capable air traffic control ground station;

send a request to the HF-capable air traffic control ground station for the time slot to transmit the generated situational awareness message; and receive, from the HF-capable air traffic control ground station responsive to the request, an indication of the time slot assigned to the HF transceiver.

3. The system of claim 2, wherein the request is also a request for a transmission frequency for transmitting the generated situational awareness message.

4. The system of claim 1 further comprising a transponder configured to broadcast information indicative of the position of the first aircraft to one or more aircrafts in proximity to the first aircraft.

5. The system of claim 1, wherein the HF transceiver is configured to receive one or more situational awareness messages from one or more third aircrafts, wherein for each third aircraft, a respective situational awareness message includes at least an indication of a position of that third aircraft and information indicative of positions of other aircrafts.

6. The system of claim 5, wherein the processor is configured to generate a positioning map representative of positions of a plurality of aircrafts based on the one or more situational awareness messages received from the one or more third aircrafts and the collision avoidance information received by the TCAS.

7. The system of claim 1, wherein the HF transceiver is configured to receive information indicative of positions of a plurality of aircrafts from the HF ground station.

8. The system of claim 1, wherein the HF channel is configured to support a transmission or reception rate of at least 1800 baud and up to 120 kilobits per second (Kbps).

9. A method for reporting aircraft situational awareness information, the method comprising:

receiving, by a global positioning system (GPS) receiver of a first aircraft, positioning signals and determining a position of the first aircraft;

receiving, by a traffic collision avoidance system (TCAS) of the first aircraft, collision avoidance information from one or more second aircrafts;

generating, by a processor of the first aircraft coupled to the GPS receiver and the TCAS, a situational awareness message using the determined position of the first aircraft and the collision avoidance information from the one or more second aircrafts; and transmitting, by a high frequency (HF) transceiver of the first aircraft coupled to the processor, while no air traffic control ground station is within automatic dependent surveillance-broadcast (ADS-B) broadcast coverage range from the first aircraft and during a time slot assigned by a HF-capable air traffic control ground station to the HF transceiver according to a time division multiplexing scheme, the generated situational awareness message in a single data packet through a HF channel to one or more HF-capable air traffic control ground stations, the HF transceiver having an operational bandwidth including a frequency band extending from 3 MHz to 30 MHz, and HF signals representing the single data packet reflecting off one or more ionosphere layers before reaching the one or more HF ground stations, the generated situational awareness message transmitted in the single data packet allowing a ground air traffic control system including the one or more HF-capable air traffic control stations to track the first aircraft while no air traffic control ground station is within ADS-B broadcast coverage range from the first aircraft.

10. The method of claim 9 further comprising:

receiving, by the HF transceiver, periodic signals from the HF-capable air traffic control ground station, the periodic signals for synchronizing with time slots defined by the HF-capable air traffic control ground station;

sending, by the HF transceiver, a request to the HF ground station for the time slot to transmit the generated situational awareness message; and receiving, by the HF transceiver from the HF-capable air traffic control ground station, an indication of the time slot assigned to the HF transceiver.

11. The method of claim 10, wherein the request is also a request for a transmission frequency for transmitting the generated situational awareness message.

12. The method of claim 9 further comprising:

broadcasting, by the transponder, information indicative of the position of the first aircraft to one or more aircrafts in proximity to the first aircraft.

13. The method of claim 9 further comprising:

receiving, by the HF transceiver, one or more situational awareness messages from the one or more third aircrafts, wherein for each third aircraft, a respective situational awareness message includes at least an indication of a position of that third aircraft and information indicative of positions of other aircrafts.

14. The method of claim 13 further comprising:

generating, by the processor, a positioning map representative of positions of a plurality of aircrafts based on the one or more situational awareness messages received from the one or more third aircrafts and the collision avoidance information received by the TCAS transponder.

15. The method of claim 9 further comprising:

receiving, by the high frequency (HF) transceiver, information indicative of positions of a plurality of aircrafts from the HF ground station.

16. The method of claim 9, wherein the HF channel is configured to support a transmission or reception rate of at least 1800 baud and up to 120 kilobits per second (Kbps).

17. A system for monitoring aircraft positioning, the system comprising:

a global positioning system (GPS) receiver of a first aircraft, the GPS receiver configured to receive positioning signals and determine a position of the first aircraft;

a traffic collision avoidance system (TCAS) of the first aircraft configured to receive collision avoidance information from one or more second aircrafts;

a processor of the first aircraft coupled to the GPS receiver and the TCAS, and configured to generate a situational awareness message using the determined position of the first aircraft and the collision avoidance information from the one or more second aircrafts;

a high frequency (HF) transceiver of the first aircraft coupled to the processor and configured to transmit, while no air traffic control ground station is within automatic dependent surveillance-broadcast (ADS-B) broadcast coverage range from the first aircraft and during a time slot assigned by a first HF-capable air traffic control ground station to the HF transceiver according to a time division multiplexing scheme, the generated situational awareness message in a single data packet through a HF channel, the HF transceiver having an operational bandwidth including a frequency band extending from 3 MHz to 30 MHz; and a network of communicatively coupled HF-capable air traffic control ground stations, including the first ground station, configured to:

receive one or more HF signals representing the single data packet including the generated message, the one or more HF signals reflecting off one or more ionosphere layers before reaching at least one of the HF-capable air traffic control ground stations; and transmit information associated with the generated situational awareness message to a server for generating a positioning map indicative of positions of a plurality of aircrafts, the positioning map allowing a ground air traffic control system including the network of communicatively coupled HF-capable air traffic control ground stations to track aircrafts while not within ADS-B broadcast coverage range from air traffic control ground stations.

18. The system of claim 17, wherein the HF transceiver is configured to:

receive periodic signals from the first HF-capable air traffic control ground station, the periodic signals for synchronizing with time slots defined by the first HF-capable air traffic control ground station;

send a request to the first HF-capable air traffic control ground station for the time slot to transmit the generated situational awareness message; and receive, from the first HF-capable air traffic control ground station responsive to the request, an indication of the time slot assigned to the HF transceiver.

19. The system of claim 17, wherein the HF transceiver is configured to receive information indicative of positions of a plurality of aircrafts from one or more of the HF HF-capable air traffic control ground stations.

20. The system of claim 17, wherein the HF channel is configured to support a transmission or reception rate of at least 1800 baud and up to 120 kilobits per second (Kbps).

* * * * *